(12) United States Patent
Brainard et al.

(10) Patent No.: US 8,438,617 B2
(45) Date of Patent: May 7, 2013

(54) USER AUTHENTICATION BASED ON VOUCHER CODES

(75) Inventors: John G. Brainard, Sudbury, MA (US); Ari Juels, Brookline, MA (US); Ronald L. Rivest, Arlington, MA (US); Michael Szydlo, Allston, MA (US)

(73) Assignee: EMC Corporation, Hopkinton, MA (US)

( * ) Notice: Subject to any disclaimer, the term of this patent is extended or adjusted under 35 U.S.C. 154(b) by 1195 days.

(21) Appl. No.: 11/926,784

(22) Filed: Oct. 29, 2007

(65) Prior Publication Data

US 2009/0113530 A1   Apr. 30, 2009

(51) Int. Cl.
  *G06F 7/04* (2006.01)
  *G06F 15/16* (2006.01)
  *G06F 17/30* (2006.01)
  *H04L 29/06* (2006.01)

(52) U.S. Cl.
  USPC ............................................................ 726/5

(58) Field of Classification Search ........................ 726/5
  See application file for complete search history.

(56) References Cited

U.S. PATENT DOCUMENTS

| | | | |
|---|---|---|---|
| 4,720,860 A | 1/1988 | Weiss | |
| 5,168,520 A | 12/1992 | Weiss | |
| 5,361,062 A | 11/1994 | Weiss et al. | |
| 2001/0055388 A1 | 12/2001 | Kaliski, Jr. | |
| 2004/0030932 A1 | 2/2004 | Juels et al. | |
| 2006/0174104 A1* | 8/2006 | Crichton et al. | 713/155 |
| 2007/0061566 A1 | 3/2007 | Bailey et al. | |
| 2007/0143831 A1* | 6/2007 | Pearson et al. | 726/5 |
| 2007/0186105 A1 | 8/2007 | Bailey et al. | |

OTHER PUBLICATIONS

Brainard (Brainard et al. "Forth-Factor Authentication . . . ", Oct. 30-Nov. 3, 2006, 11 pages).*
J. Brainard et al., "Fourth-Factor Authentication: Somebody You Know," CCS '06, Oct. 30-Nov. 3, 2006, 11 pages.
A Simple Distributed Security Infrastructure (SDSI) web page, http://theory.lcs.mit.edu/~cis/sdsi.html, 2001, pp. 1-3.
M. Blaze et al., "The KeyNote Trust-Management System Version 2," Network Working Group, RFC 2704, Sep. 1999, pp. 1-35.
M. Blaze et al., "Compliance Checking in the PolicyMaker Trust Management System," Financial Cryptography, 1998, 21 pages.
William Eazel, "'Live Phishing' Experiment Nets Consumers Hook, Line, and Sinker," SC Magazine, Nov. 8, 2005, pp. 1-2.
C. Ellison, "UPnP™ Security Ceremonies Design Document for UPnP™ Device Architecture 1.0," www.upnp.org, Oct. 3, 2003, pp. 1-18.
C. Ellison, IETF RFC 2692: "SPKI Requirements," Sep. 1999, pp. 1-14.

(Continued)

*Primary Examiner* — Kambiz Zand
*Assistant Examiner* — Stephen Sanders
(74) *Attorney, Agent, or Firm* — Ryan, Mason & Lewis, LLP (57) ABSTRACT

An authentication server authenticates a first user, and generates a voucher code that is provided to the authenticated first user. The first user may provide the voucher code to a second user, responsive to a request by the second user for the first user to vouch for the second user, to thereby allow the second user to be authenticated. The authentication server receives the voucher code from the second user, and authenticates the second user based on the voucher code. The authenticated second user may be provided with a temporary password or other type of code utilizable for at least one additional authentication.

20 Claims, 3 Drawing Sheets

OTHER PUBLICATIONS

RSA Security Inc., RSA SecurID Authenticators, Product Specification, www.rsasecurity.com, 2007, 4 pages.
J.M. Mccune et al., "Seeing-Is-Believing: Using Camera Phones for Human-Verifiable Authentication," IEEE Symposium on Security and Privacy, 2005, 15 pages.
T. Pullar-Strecker, "NZ Bank Adds Security Online," Sidney Morning Herald, www.smh.com.au, Nov. 2004, pp. 1-2.
B. Ross et al., "Stronger Password Authentication Using Browser Extensions," USENIX Security, 2005, 15 pages.

* cited by examiner

FIG. 1

FIG. 2

USER AUTHENTICATION BASED ON VOUCHER CODES

FIELD OF THE INVENTION

The present invention relates generally to the field of secure authentication, and more particularly to authentication techniques which permit one user to vouch for another user in order to facilitate authentication.

BACKGROUND OF THE INVENTION

In a typical conventional two-factor authentication system, a user is equipped with an authentication token. The authentication token may be implemented as a small, hand-held device that displays a series of passwords over time. These passwords, which may be one-time passwords, are more generally referred to herein as tokencodes. A user equipped with such an authentication token reads the currently displayed password and enters it into a computer or other element of an authentication system as part of an authentication operation. The user is also generally required to enter a personal identification number (PIN). Two-factor authentication is thus based on something the user has (e.g., the authentication token) and something the user knows (e.g., the PIN).

Three-factor authentication systems are also available, where the third factor required for successful authentication relates to a physical characteristic of the user, or in other words, something the user is (e.g., a fingerprint).

Conventional authentication tokens include both time-based tokens and event-based tokens. In a typical time-based token, the displayed passwords are based on a secret value and the time of day. A verifier with access to the secret value and a time of day clock can verify that a given presented password is valid. One particular example of a time-based authentication token is the RSA SecurID® user authentication token, commercially available from RSA, The Security Division of EMC Corporation, of Bedford, Mass., U.S.A. In a typical event-based token, the displayed passwords are based on a secret value and an event counter. The event counter may count the number of occurrences of a particular event, such as a user pressing a button on the token. A verifier with access to the secret value and the current event count can verify that a given presented password is valid.

Passwords can be communicated directly from an authentication token to a computer or other element of an authentication system, instead of being displayed to the user. For example, a wired connection such as a universal serial bus (USB) interface may be used for this purpose. Wireless authentication tokens are also known. In such tokens, the passwords are wirelessly communicated to a computer or other element of an authentication system. These wired or wireless arrangements save the user the trouble of reading the password from the display and manually entering it into the computer.

Additional details of exemplary conventional authentication tokens can be found in, for example, U.S. Pat. No. 4,720,860, entitled "Method and Apparatus for Positively Identifying an Individual," U.S. Pat. No. 5,168,520, entitled "Method and Apparatus for Personal Identification," and U.S. Pat. No. 5,361,062, entitled "Personal Security System," all of which are incorporated by reference herein.

A problem that can arise for users equipped with authentication tokens is that such users may want to authenticate to a given system without having physical possession of an operative token. For example, the user may have temporarily misplaced the token, forgotten to bring it home from the office or vice-versa, left it in the car, etc. Also, the token may break, or its battery may become depleted, etc. However, conventional authentication systems, such as the two-factor and three-factor systems noted above, generally require that the user be in physical possession of an operative token in order to authenticate.

Accordingly, a need exists for an authentication system that can securely authenticate users of two-factor or three-factor systems without such users being in physical possession of respective operative authentication tokens.

SUMMARY OF THE INVENTION

The present invention in one or more of the illustrative embodiments described herein meets the above-identified need by providing an authentication system that allows one user to vouch for another user. This vouching functionality in effect provides a fourth authentication factor, namely, somebody that the user knows. The additional vouching factor advantageously allows for secure authentication in two-factor or three-factor systems when a user does not have physical possession of an operative authentication token. Moreover, it can provide secure authentication in other situations, such as when a user has physical possession of an operative authentication token but has forgotten a corresponding PIN. Thus, the fourth authentication factor based on vouching can be used to replace a given missing authentication factor in an otherwise conventional two-factor or three-factor authentication system.

In one aspect of the invention, a user authentication method comprises the steps of authenticating a first user, generating a voucher code that is provided to the authenticated first user, receiving the voucher code from a second user, and authenticating the second user based on the voucher code. The steps of the method may be performed by an authentication server in an authentication system, where the system further comprises first and second computers or other processing devices corresponding to the respective first and second users and configured for communication with the authentication server.

The first user may provide the voucher code to the second user responsive to a request by the second user for the first user to vouch for the second user to thereby allow the second user to be authenticated. The authentication server may be configured such that the voucher code must be received within a limited time period designated for a corresponding vouching session initiated by the first user. Also, the first user may be notified of the success or failure of authentication of the second user based on the voucher code.

The authenticated second user may be provided with a temporary code based on the voucher code and utilizable for at least one additional authentication. For example, the temporary code may be valid for multiple subsequent authentications of the second user after expiration of the voucher code. The temporary code may be selected by the second user responsive to a successful authentication of that user.

In one embodiment, an authentication token of the second user is not currently available for use in authentication. The second user in such an embodiment may be authenticated utilizing the voucher code and a PIN as submitted by the second user.

In another embodiment, the authentication token of the second user is currently available for use in authentication, but the second user has forgotten the PIN. The second user in this embodiment may be authenticated utilizing the voucher code and a tokencode from the authentication token.

The authentication server may be configured to require establishment of a helper-asker relationship between the first and second users prior to permitting the second user to be authenticated based on the voucher code. The first user may be provided with an opportunity to accept or deny the helper-asker relationship prior to the server storing information indicative of establishment of the helper-asker relationship. It may be desirable in certain implementations to at least partially automate the establishment of the helper-asker relationship, utilizing existing relationship information available from a database, such as corporate organizational chart information.

The illustrative embodiments advantageously overcome the above-noted drawbacks of conventional authentication systems. For example, if a given user equipped with an authentication token misplaces or forgets that token, or if the token breaks or has its battery depleted, that user can still be authenticated using a voucher code generated based on input from another user. Similarly, if the user has an operative authentication token, but has forgotten a corresponding PIN, that user can still be authenticated utilizing the voucher code and a tokencode from the authentication token.

These and other features and advantages of the present invention will become more readily apparent from the accompanying drawings and the following detailed description.

DETAILED DESCRIPTION

The present invention will be described herein with reference to exemplary authentication systems and associated servers and other processing devices. It is to be appreciated, however, that the invention is not restricted to use with the particular illustrative system and device configurations shown.

The term "code" as used herein is intended to include authentication information such as one-time passwords or other tokencodes, or more generally any other information that a user may be required to submit for authentication purposes. Although the illustrative embodiments will be described below in the context of passwords, it is to be appreciated that the invention is more broadly applicable to any other type of authentication information.

Figure 1:
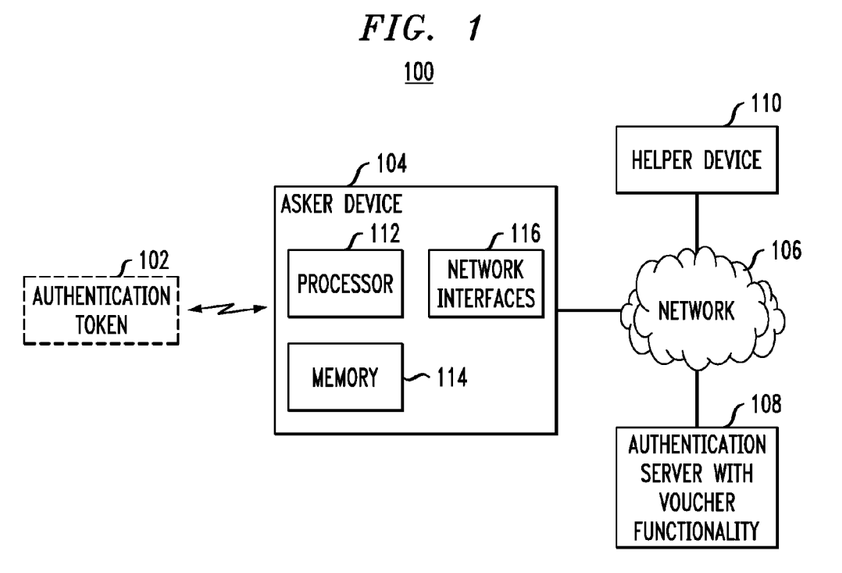
FIG. 1 is a block diagram showing one example of an authentication system in an illustrative embodiment of the invention.

FIG. 1 shows an example of an authentication system 100 which includes an authentication token 102, an asker device 104, a network 106, an authentication server 108 and a helper device 110. The authentication token is configured to generate one-time passwords or other tokencodes in a conventional manner. Such passwords may be presented to a user via a display of the token, such that the user can manually enter a given password into a user interface of the asker device 104. Alternatively, a given password may be communicated directly from the authentication token via a wired or wireless connection between that device and the host device. By way of example, the authentication token may be configured to communicate with the asker device 104 via a wired connection such as a USB interface, or via a wireless connection such as a Bluetooth or IEEE 802.11 connection. The asker device thus serves as a host device for the authentication token.

The authentication token 102 may be a time-based authentication token, an event-based authentication token, a hybrid time-based and event-based token, or any other type of authentication token.

In the FIG. 1 embodiment, the authentication token 102 is associated with a user of the asker device 104. The token is shown in dashed outline because for this particular embodiment it is assumed that the token is temporarily not available to the user for some reason. For example, the user may have misplaced the token, or forgotten to bring it home or into the office, or the token may be broken or have a depleted battery, etc. This user is referred to as an "asker" because in accordance with the voucher functionality of the system 100, he or she asks another user, referred to as a "helper," to vouch for the asker so as to permit the asker to authenticate to the system without being in physical possession of the token. The voucher functionality in effect provides a backup or emergency authentication process that can be used when the authentication token is not readily available.

An authentication system such as that shown in FIG. 1 that implements a vouching protocol or other vouching process is also referred to herein as a "vouching system."

In order to facilitate description, the asker will sometimes be referred to herein as Alice and the helper as Harry.

The asker device 104 as shown includes a processor 112, a memory 114 and one or more network interfaces 116. A given such network interface is utilized for communicating in a conventional manner with the network 106. The helper device 110 may be configured in a similar manner, to include processor, memory and network interface elements.

The asker device 104 and helper device 110 may each comprise, for example, a desktop or portable personal computer, mobile telephone, personal digital assistant (PDA), wireless email device, workstation, kiosk, television set-top box, game console, or any other information processing device that supports communication with an authentication server over a network.

The network 106 may comprise, for example, a global computer network such as the Internet, a wide area network (WAN), a local area network (LAN), a satellite network, a telephone or cable network, or various portions or combinations of these and other types of networks.

A wide variety of conventional authentication processes may be implemented using an operative authentication token, host device and authentication server arranged as shown in FIG. 1. These primary authentication processes may be utilized when an operative token is in the physical possession of the user. Such primary authentication processes are well known to those skilled in the art.

It is to be appreciated that a given embodiment of the system 100 may include multiple instances of authentication token 102, asker device 104, network 106, authentication server 108, and helper device 110, although only single instances of such components are shown in the simplified system diagram for clarity of illustration. For example, the helper may also be equipped with an authentication token, where such a token generates passwords that are supplied to the helper device 110 for authentication of the helper.

Figure 2:
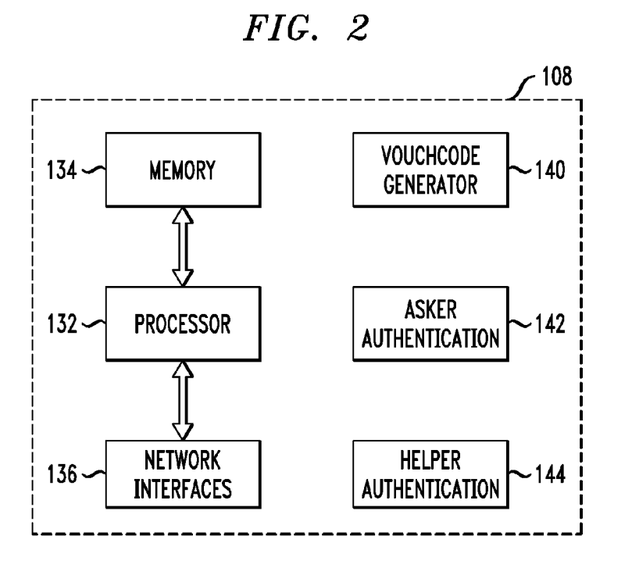
FIG. 2 shows a more detailed view of one possible implementation of an authentication server of the FIG. 1 system.

Referring now to FIG. 2, a more detailed illustrative implementation of authentication server 108 is shown. The authentication server in this embodiment comprises a processor 132 coupled to a memory 134. The processor 132 is also coupled to interface circuitry comprising one or more network interface 136.

The various elements 132, 134 and 136 of FIG. 2 may be implemented in whole or in part as a conventional microprocessor, microcontroller, digital signal processor, application-specific integrated circuit (ASIC) or other type of circuitry, as well as portions or combinations of such circuitry elements. As will be appreciated by those skilled in the art, portions of a voucher authentication process in accordance with an embodiment of the invention can be implemented at least in part in the form of one or more software programs that are stored at least in part in memory 134 and executed by processor 132.

A given embodiment of authentication server 108 may be implemented as a computer or other stand-alone processing platform, or may be distributed over multiple processing platforms comprising multiple separate computers. Numerous other arrangements of the authentication server are possible.

The authentication server 108 is configured to support voucher functionality, as will be described in greater detail in conjunction with FIGS. 3 and 4. In the embodiment shown in FIG. 2, this functionality is provided by a voucher code or "vouchcode" generator 140, an asker authentication element 142 and a helper authentication element 144. The components 140, 142 and 144 may be implemented in whole or in part utilizing software programs stored in memory 134 and executed by processor 132.

A vouchcode as the term is used herein is not required to have any particular format, and could, for example, have a format similar to that of other authentication information used in a given application.

In operation of the FIG. 2 embodiment, the helper leverages his or her primary authentication in order to allow the asker to perform backup or emergency authentication. The authentication server 108 authenticates the helper, utilizing helper authentication element 144, and generates a vouchcode in generator 140 that is provided to the authenticated helper. The helper then supplies the vouchcode to the asker. The authentication server receives the vouchcode from the asker, and utilizes asker authentication element 142 to authenticate the asker based on the vouchcode. The various communications between the asker, helper and authentication server may occur over network 106, using conventional communication protocols and associated interfaces.

An illustrative embodiment of the invention will now be described in greater detail with reference to FIGS. 3 and 4. In this embodiment, it will be assumed that both the asker and the helper are equipped with authentication tokens, and that those tokens are conventional RSA SecurID® user authentication tokens. It is further assumed that the asker has temporarily lost the ability to use her token, but remembers the corresponding PIN. It should be noted that these and other assumptions made herein are for illustrative purposes only, and should not be construed as requirements of the invention.

The following description will make use of a model of the parties and their associated communication channels. The parties in this model include users, an authentication server, and one or more adversaries. The users may be askers or helpers, although a given user may be a helper in one authentication situation and an asker in another. Again, the particular parameters of this model, like other assumptions made herein, are for illustrative purposes only.

Parties are denoted by a capital letter (e.g., X), and to each party we associate an identifier, which will be denoted with the corresponding lowercase letter. For example, the identifier of a party X will be denoted by x. Within an invocation of a protocol among parties, we use the notation X(y) to indicate that party X has represented itself as having claimed identifier y. With this notation, an honest party X will always be represented as X(x). It is assumed that parties use consistent identifiers throughout the protocol, unless otherwise indicated.

Users have certain initial conditions imposed on them that can be expressed as relations.

Namely, some users are enrolled as helpers, and users are organized in a (helper, asker) relation H where each helper is assigned a subset of users as askers; we say (Y, N)∈H if a user X is an asker for user Y acting as a helper.

In this model, the communication channels to and from the server are considered to be secure. In particular, this means that no adversary can obtain any information by eavesdropping over such channels. In practice, channels between an entity and the server may be implemented using a well-known secure protocol such as secure sockets layer (SSL). The channel between an asker and a helper may be less secure, and the protocol should be configured to mitigate eavesdropping risks on this channel.

Authentication Data Items: The primary authentication protocol and the vouching protocol in the present embodiment both involve two factors that the user presents to the system in order to be accepted as authenticated. In the primary protocol, these two factors are the PIN, PN, which is a user memorizable string, and the tokencode, TK, which is generated from the authentication token. In the vouching protocol, it is assumed that the tokencode is not available, and this factor is replaced with a vouchcode.

To model the information made available in a protocol message by parties, we introduce the notation (X(u):VA) to indicate the event wherein a party X sends a message claiming identity u and correctly presents the value item of VA. The following assumptions concern the probabilities of an adversary being able to present the user's PN and TK at any point within the protocol.

1. For any party X and any identifier y, the probabilities prob{X(y):PN} and prob{X(y):TK} are independent.

2. The legitimate user U who chose the PIN value and possesses the token and enrolled in the system as u can always present the PIN and tokencode. That is, prob{U(u):PN}=prob{U(u):TK}=1. These assumptions amount to a user being able to recall his or her PIN value and also being in possession of his or her token.

3. An adversary, A, who is not U, and has not obtained U's PIN value PN, can only present it with small probability. That is, prob{A(u):PN}≦ε.

4. An adversary, A, (where A≠U), can only present a tokencode with small probability. That is, prob{A(u):TK}<δ.

Note that the adversary's probability of successfully presenting the required values (PN or TK) is the probability bound on the union of two events: (1) the adversary guessing the value (which is typically assumed long enough and to contain a certain amount of entropy), and (2) the adversary stealing or otherwise obtaining the value.

Authentication Ceremony: An authentication ceremony AC is a sequence of interactions between a number of parties. Once defined, a ceremony is invoked by various parties (with certain relationships among them) who follow a sequence of actions. We use notation $AC_T$ to refer to a ceremony of type T or an instance of this type of ceremony. To specify the parties $P_i$ and the identifiers $p'_i$ presented by these parties we use the notation $AC_T(P_1(p'_1), P_2(p'_2), \ldots )$.

In an authentication ceremony parties exchange messages via secure channels, and one of the parties will be the server S. The server is assumed to be trusted and its role is to accept the legal executions and reject the adversarial ones. The correctness and security definitions of an authentication ceremony are defined in terms of the server's final state, which in this model is always either "accept" or "reject."

Interactive Logging and Detection: Given a ceremony, we may consider an extended ceremony where in addition to message channels there exist also "logging channels" where parties post information "about" the ceremony: e.g., posting the time of the invocation, the parties, and the state of the execution). These logging channels are not erasable by the parties, and can be viewed as a bulletin board maintained by the trusted server, and can be implemented by getting e-mail upon demand from the server.

By considering the extended ceremony that includes the original messages that are designed to stop impersonation (i.e., to reduce the probability of an attack), logging and log evaluation further allow for the detection of any successful attacks. For example, a party evaluating the log may detect unexpected behavior such an authentication under its identifier in which it did not take part. We denote the logging channels available to party U as LG(U). The party reads and evaluates the log and decides whether there as been an attack or not. If an attack is detected in this way appropriate countermeasures can be taken. In actual implementation, the logging functionality may be implemented as a combination of e-mail notifications and server logs.

Correctness: The correctness requirement of the system is that when the parties act honestly, the authentication attempt will succeed, i.e., for a given authentication ceremony $AC=AC(P_i(p_i))$ (where in all cases party $P_i$ and its true identifier $p_i$ are involved and where the parties satisfy the initial required relationships) then the server "accepts."

Security Properties: To describe the security properties of a ceremony, we define adversaries (outsiders and insiders) who attack other parties. In an authentication ceremony, the adversarial goal is to impersonate a party. There are two types of security properties: (1) Prevention: where the server accepts an invocation with a party claiming a wrong identifier only with small probability. (2) Detection: where successful attacks are realized by parties.

The illustrative embodiment of FIGS. 3 and 4 will now be described with reference to the model given above. Again, it is assumed that both the asker and the helper are equipped with conventional RSA SecurID® user authentication tokens, although the disclosed techniques can be applied to a wide variety of other types of authentication tokens. An RSA SecurID® token typically takes the form of a key fob or card that displays a fresh numerical value, called a tokencode, every sixty seconds. To authenticate to a computer application, the user must type the current tokencode together with a user-specific PIN.

The tokencodes in a conventional RSA SecurID® installation are validated by an authentication server. This server shares a secret seed with every token and also the PIN of the user, allowing it to validate tokencode/PIN pairs. A tokencode is typically computed as a cryptographic function of the current time and a secret key shared between the token and authentication server.

We will describe the primary authentication system $AC_P$ and the vouching system $AC_V$. In both cases we will describe the messaging and the extended ceremony with logging.

We first review the primary two-factor authentication protocol, $AC_P$, which does not include vouching. This illustrates the primary authentication system upon which a vouching system will be constructed in the present embodiment.

Enrollment: The process gives each user a PIN value and an authentication token that at each time unit produces a tokencode. At the server side the user identifier is associated with its chosen PIN and with the specific tokencode. Thus the server is able to produce the authentication values and compare them to the ones presented by the user.

Authentication Session: Once enrolled, a user U authenticates by presenting identifier u, PIN PN and current TK to the server via a secure channel. Once the server gets the values it checks them against computed and/or stored values. If the values match the server "accepts" and otherwise it "rejects."

If logging is implemented, the server logs to LG(U) that a session with u has taken place at its given time unit. This logging event is available to user U (and is not manipulated by it), and U can evaluate the log.

Properties of the regular protocol include the following:

1. Correctness: For the legitimate user U claiming to be U, $prob\{U(u):PN\}=prob\{U(u):TK\}=1$; thus the server will always accept.

2. Security (prevention): The adversary A performs the authentication session with identity u which is not his own. Since $prob\{A(u):PN\}<\epsilon$ and independently, $prob\{A(u):PN\}<\delta$, the server accepts with probability at most $\epsilon\delta$, which is very small, thus impersonation is prevented.

3. Security (detection): The server maintain logs that are accessible by the user at all times such that, in the unlikely event that A is successful, U will learn about a session initiated under her identity at a time when she herself did not participate. Thus she will detect the break.

The illustrative vouching protocol will now be described in detail. The vouching protocol in this embodiment is designed to deal with the case in which a user does not have her token available, but does recall her PIN. In other words, it is designed to deal with unavailability of one of the two authentication factors of a two-factor system. The vouching protocol involves this user (i.e., asker) contacting a pre-registered helper for assistance in authenticating herself. The helper obtains a vouchcode from the server. The helper communicates the vouchcode to the asker. The vouchcode aids the asker in the backup or emergency authentication process. The vouching system involves the server, the user (i.e., asker) and helper. The vouching ceremony is denoted $AC_V=AC(S, U, H)$. We now explain in detail the steps involved in the vouching protocol.

Enrollment: In this stage formally the relation H(X, Y) is created. The server records this relation and each user learns its helpers and its askers.

It is a matter of system policy which users may act as helpers for a given asker, and how those helpers are designated. One possibility is for an asker to be enrolled in the voucher system concurrently with the original provisioning of the authentication token. At this time an appropriate administrator (or perhaps the asker's supervisor) is notified by e-mail to take action. This notification directs the administrator to a management interface through which the administrator can explicitly specify which helpers are be allowed to vouch for this asker. The same management interface allows for subsequent modifications to the association of helpers to askers. Each helper is automatically sent e-mail notifying him of this responsibility, and must acknowledge and agree to the corporate policy concerning vouching. This may be implemented in a very convenient way, for example, embedding an "accept" button in the e-mail notification. We believe that the explicit nature of assuming responsibility as a helper is central to clarifying the accountability of security risks.

The process of assigning helpers to askers can also be partially automated by populating the management interface with existing relationship data, such as that contained in corporate organizational charts. A variant of the enrollment procedure might allow askers to choose their own helpers, although this could increase risks if a supervisor is not involved.

Figure 3:
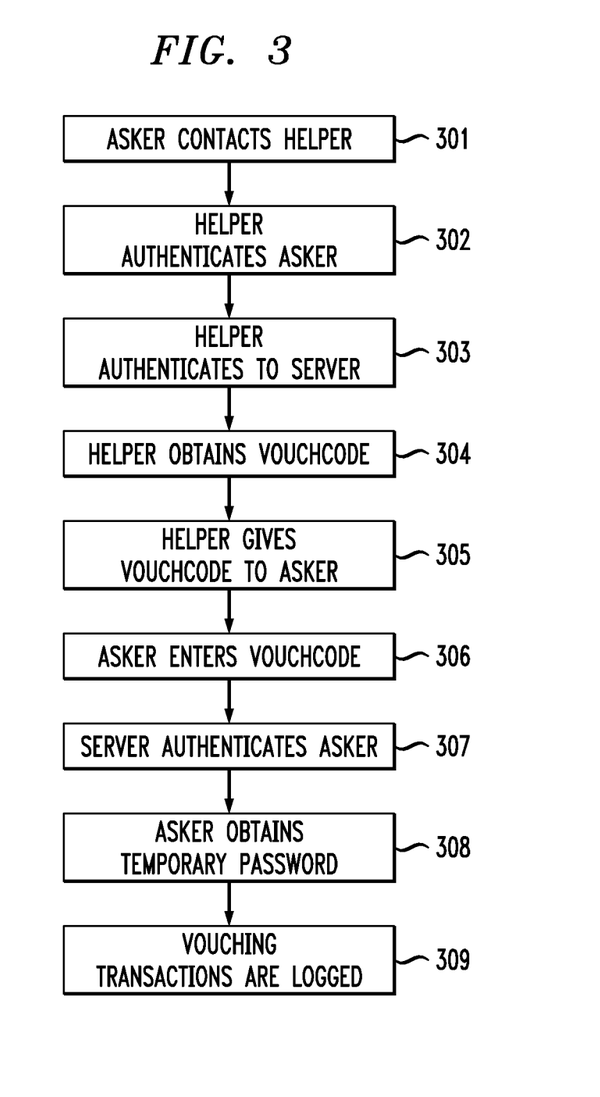
FIG. 3 is a flow diagram showing a vouching protocol in an illustrative embodiment of the invention.

Once enrolled, an asker who has lost the ability to use her token may cooperate with a helper to achieve emergency authentication via the following steps 1 through 9, which correspond to respective steps 301 through 309 shown in the flow diagram of FIG. 3:

1. Asker Contacts Helper: The vouching protocol begins with the asker U contacting the helper H via an out-of-band channel and claiming to be u. The channel can be the telephone or even face-to-face contact. As we explain later, e-mail contact should be deprecated or prohibited.

2. Helper Authenticates Asker: The helper verifies the identity of the asker. Formally, the process has to assure H with probability at least $1-\mu$ (for small $\mu$) that the claimed identifier u is the asker's true identifier. In implementing this step over a telephone communication, the helper makes sure that he recognizes the asker's voice (and her telephone, if possible, using caller-ID); the helper may, if in doubt, ask questions that help confirm the asker's identity. In the case of face-to-face contact, the helper authenticates the asker as a matter of course. It is also assumed that the asker identifies the helper and that they both recognize that they are in a helper-asker relationship.

3. Helper Authenticates to Server: Using the helper device, the helper accesses a vouching-specific web page. Through this interface, the helper strongly authenticates himself to the server using two-factor authentication, i.e., using his token TK and PIN value PN as in the regular authentication session described above. The helper asserts identity h and declares that he is helping user u.

4. Helper Obtains Vouchcode: In response to successful authentication, the helper is prompted by the server S for the name of the asker. The server verifies that H and U are in the helper-asker relationship. If the verification succeeds, the helper then receives an asker-specific vouchcode VC (we assume that VC is guessable with probability at most $\delta$). The server further marks the fact that there is an ongoing vouching session involving H and U. The vouchcode may, for example, assume an alphanumeric form amenable to verbal communication. For easy communication, it should also be relatively short; it contains 20 bits of entropy in a particular implementation to be described below.

5. Helper Gives Vouchcode to Asker: Next, H informs U of the value VC, for example, orally in the case of telephone communication, and either orally or as a written value in the case of face-to-face contact.

6. Asker Enters Vouchcode: U asserts identity u and presents her PN and VC to S. For example, using a special-purpose web interface accessed via the asker device, the asker authenticates by entering her username, the vouchcode, and her PIN.

7. Server Authenticates Asker: Upon receipt of this information, the server identifies in its database an active vouching session for this asker. A vouching session is considered active if it has been initiated by a valid helper within a short time period as specified by the system policy (e.g., 3 minutes). This timeout helps ensure tight synchronization of the vouching protocol, and that vouchcodes are not saved for later use. The server verifies the asker's PN and VC. The server either "accepts" the authentication attempt or "rejects", i.e., aborts the vouching session; either way, the asker is informed of the result.

8. Temporary Password: If the asker has successfully authenticated, she is prompted to choose a temporary password TP and granted access for the current session. The asker can use this temporary password together with PN for subsequent sessions, while the vouchcode becomes invalided. The asker's temporary password expires after a time period specified by system policy (e.g., one or two days).

One important reason to have the asker convert her vouchcode into a temporary password is that a user-selected password is likely to be easier to remember than a system-generated vouchcode. Additional security-related reasons will be addressed below.

9. Logging: An important component of a voucher system is its support for detection mechanisms based on user notification and administrator audit. Accordingly, confirmations of successful and/or failed asker authentication should be sent to the helper and to the asker (and, as a system option, to an administrator). Additionally, an audit log should record all transactions in the vouching system.

Briefly, then, in order to obtain a vouchcode for use by the asker, the helper makes use of the registered helper-asker association and his ability to perform strong authentication. The asker employs this vouchcode and her PIN to obtain a temporary password. This password serves effectively as a token substitute: the asker may use it in lieu of a tokencode wherever system policy permits.

Figure 4:
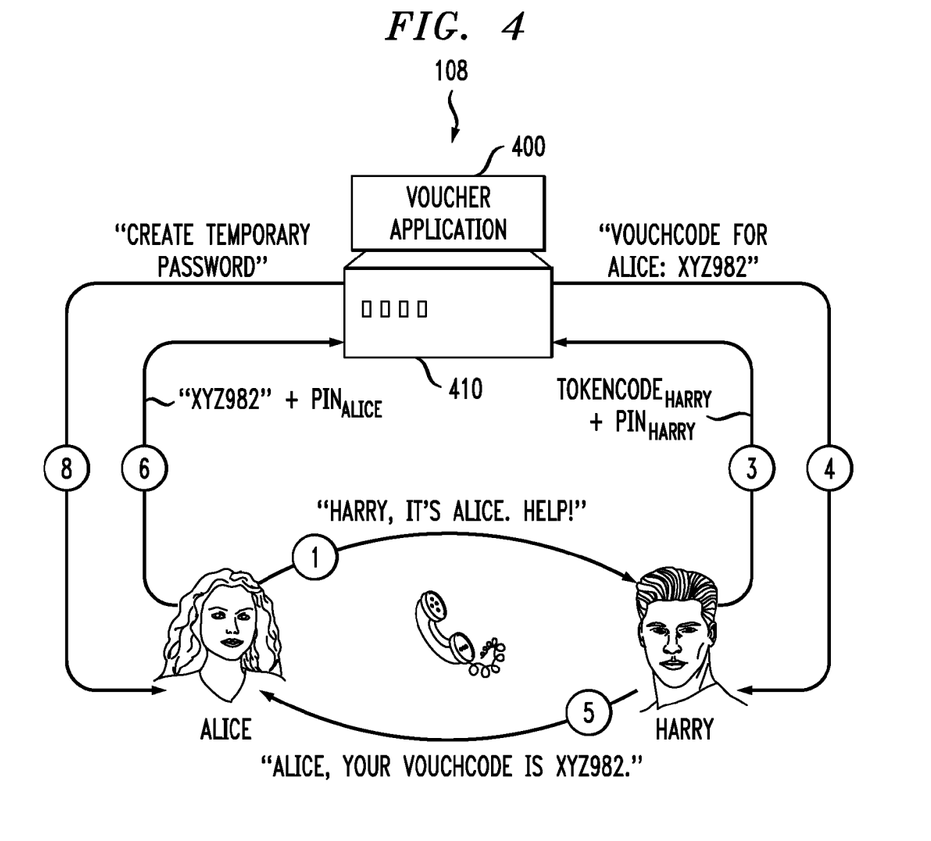
FIG. 4 shows the interactions between an asker, a helper and a voucher application in an illustrative embodiment of the invention.

FIG. 4 illustrates certain steps of the vouching protocol of FIG. 3 as carried out between an asker Alice and a helper Harry. These users communicate with authentication server 108 via their respective devices 104, 110 over the network 106. The authentication server in this embodiment comprises a voucher application program 400 running on a processing platform 410. The communications shown in this figure include those associated with steps 1, 3, 4, 5, 6 and 8 of the above vouching protocol, as indicated by the numerals associated with the directed lines in FIG. 4. As previously indicated, these steps correspond to steps 301, 303, 304, 305, 306 and 308 of the FIG. 3 flow diagram. The other steps of the vouching protocol are assumed to be implicit in the FIG. 4 diagram, and are omitted for clarity.

In step 1 as shown in FIG. 4, Alice contacts Harry via telephone and asks for help, that is, asks for Harry to vouch for her in a vouching protocol. Harry provides his tokencode and PIN in step 3, and in response receives a vouchcode for Alice in step 4. The vouchcode in this example is XYZ982. He communicates the vouchcode to Alice in step 5, who enters it along with her PIN in step 6. The server authenticates Alice based on the voucher code and her PIN, and in step 8 directs her to create a temporary password.

It is to be appreciated that the particular protocol steps shown in FIGS. 3 and 4 and described above are exemplary only, and other embodiments may utilize different steps to implement a vouching system in accordance with the invention.

Correctness and security properties of the above-described illustrative vouching protocol will now be described.

Correctness: The correctness property requires that a legitimate user U (claiming to be u) when asking H (claiming to be h) for help will always be successful in getting the server S to accept provided H(H, U). To see that correctness holds, we simply examine the steps of the protocol.

1. In steps 1 and 2, H and U will recognize each other and U has a way to assure H of her identity with probability 1.

2. In steps 3 and 4, H will cause S to accept its authentication with probability 1. This is based on the correctness claim of the regular authentication protocol.

3. Successful authentication will result in a vouchcode VC that will get to U in step 5. The server S is expecting this value within a vouching session. Since H(H, U), S will produce a VC associated with H and U with probability 1.

4. In steps 6, 7, and 8, U will be able to present her identifier u, PN, and VC correctly to the server, which will accept with probability 1. Furthermore, U will be able to enter her chosen temporary password TP.

5. Finally, the log messages will always be received by U and H, who expect them as a positive feedback.

The security of this illustrative embodiment will be described by enumerating several formal properties and discussing specific types of attacks. Practical security concerns such as social engineering will be treated later.

We assume here that an adversary does not benefit from collusive attacks, as should be the case in well-designed systems enforcing independence among user PINs and authenticators. In fact, when an adversary is attacking a user in the system, we may assume it controls all other users who are not involved in the session and their secrets and we merely concentrate on a specific invocation. We also assume the trustworthiness of the enrollment process, and the system administration and server S. If these assumptions did not hold, the primary authentication mechanism itself would be vulnerable.

To describe the desired security properties we need to first clarify the capabilities of the Adversary. By an "outside attacker" we mean an attacker who is not enrolled in the system as either a user or a helper. By an "inside attacker" we mean an attacker who is an asker, a helper, or another inside party who acts under a false identifier or without the preconditioned relationship holding.

Prevention Requirements: In an authentication ceremony, the most important aspect of security is to prevent unauthorized access. We define the prevention aspect of security in terms of the following adversarial invocations. Any adversary taking part in a protocol in any of these instances should lead to S rejecting with high probability.

1. User impersonation by an outsider: An instance where $AC_V(S, A(u), H(x))$ where $A \neq U$ should not be accepted. The actual helper H may or may not be present.

2. Helper impersonation by an outsider: An instance where $AC_V(S, U(x), A(h))$, where $A \neq H$, should not be accepted. Such an instance should fail regardless of the user.

3. Helper not registered: When $(U', H') \notin H$, an instance of the form $AC_V(S, U'(u'), H'(h'))$, should not be accepted. Such an instance should fail even if U' and H' are colluding.

4. H attacking U: An instance $AC_V(S, H(u), H(h))$, where H is an adversary trying to impersonate U, should not be accepted.

5. U attacking H: An instance $AC_V(S, U(u), U(h))$, where U is an adversary trying to impersonate H, should not be accepted.

Detection Requirements: The following detection properties deal with the case in which an attacker has managed to get the server to accept the authentication attempt. In such a case, detection is a second line of defense.

1. Detecting user impersonation by an outsider: In case of a successful instance where $AC_V(S, A(u), H(x))$ with $A \neq U$ (user impersonation, with or without the actual helper H being present), U will detect it in the log.

2. Detecting helper impersonation by an outsider: In case of a successful instance $AC_V(S, U(x), A(h))$, where $A \neq H$, i.e., helper impersonation by a third party, regardless of the user, H will detect it in the log.

3. Illegal help request: In case of a successful instance where $AC_V(S, U'(u'), H'(h'))$ where (U', H') not in H (U' and H' are colluding in this attack), U and H will detect it in the log.

4. Detecting H attacking U: In case of a successful instance where $AC_V(S, H(u), H(h))$, where H is an adversary trying to impersonate U, U will detect it in the log.

5. Detecting U attacking H: In case of a successful instance where $AC_V(S, U(u), U(h))$, where U is an adversary trying to impersonate H, H will detect it in the log.

Next we discuss how the above definition is satisfied by the illustrative protocol.

1. Outside Attacker Impersonates User: We first consider the case of an outside attacker who targets user U enrolled in the voucher system as an asker. Of course, the attacker can, irrespective of the presence of the vouching system, impersonate U by obtaining or guessing her current TK and PN and using the regular authentication session, but this was shown to be an event of small ($\epsilon\delta$) probability.

The adversary A may start an instance as user U, with $A \neq U$, but he will fail with overwhelming probability to convince H that he is U in step 2.

The adversary might also try to obtain U's vouchcode and PIN. The first way for the attacker to obtain U's vouchcode is by guessing it (knowing that U has asked for help and a VC exists). But guessing PN and VC is not easier than guessing TK and PN.

In the unlikely event that the user has been impersonated, she will be able to detect it in the log.

2. Outside Attacker Impersonates Helper: Next the attacker may attempt to impersonate the helper. This is an instance of the protocol AC (S, U(u), A(h)) where $A \neq H$. In this case step 3 will fail with probability $1-\epsilon\delta$. Again, in the unlikely event of success the helper will detect the attempt in the log.

3. Unregistered Helper: Another attack on the system can be an instance where the user U' and the helper H' do not have the precondition relation (H', U')∈H. While a helper can obtain a vouchcode for a user who is a registered asker for H', the system will not produce a vouchcode in step 4 for user U' who is unregistered. In the unlikely event that a legal helper H is impersonated by an adversary, H will recognize an interactive logging event that he has not actually taken part in.

4. Helper attacks Asker: Once an asker is assigned a helper in the enrollment process there is a risk that the helper attacks the asker. H can obtain a vouchcode for U without even involving her. By guessing U's PN (with probability $\epsilon$ in the model), H can then impersonate the asker in the voucher system.

Briefly, then, the main new risk that the vouching protocol introduces is that security against malicious helpers is reduced to that of obtaining the asker's PIN. In case of a successful attack, U finds a session in the log in which she did not participate.

In the above definition of an authentication ceremony we assume that a party presents itself with a consistent identity throughout the protocol instance. In reality, in the vouching protocol, an adversary acting as a helper may present itself to a user under one identity and to the system under another identity. The analysis of such attacks with divergent identities is very similar to our analyses with consistent identities.

5. Asker attacks Helper: When an asker U attempts to attack the helper in the model, the asker can only ask for help, authenticate herself, and obtain a vouchcode. No helper-specific information is leaked or made available to the asker. Thus, an asker can only attack a helper as an outsider, and no better.

Additional pragmatic consideration of attacks beyond the model will now be addressed.

Remarks on Outsider Attacks: We have formally modeled attacks on vouchcodes via a guessing or misbehaving adversarial helper. We note that in practice an avenue for an outside attacker is to obtain a vouchcode in transit, for example if it is communicated over insecure e-mail from H to U. This is one reason why e-mail should be discouraged or prohibited on the asker-helper channel. As we discuss below, an attacker can alternatively attempt to extract U's vouchcode from H via social engineering. To ensure that such refined attacks do not weaken the vouchcode system, it is desirable that their collective probability be at most a small value δ, although this value need not be rigorously quantified. One reason to have the asker convert a vouchcode into a temporary password (i.e., step 8 of the vouching protocol) is to minimize the risk of vouchcode compromise by an outside attacker. If, for example, the helper provides the vouchcode to the asker on a slip of paper, then it is particularly desirable that the vouchcode expire quickly.

Remarks on Illegal Helping: The system should avoid situations where it is easy for a helper to get the PIN of the asker, e.g., when the asker is tempted to use the helper device (for example in the helper's office) in order to get a temporary password, while the helper has a malicious software that logs and snatches the asker's PIN.

Remarks on Asker Attacking Helper: Playing the role of the helper in an actual real world setting carries some risk. U could ask H to vouch for her, i.e., request a vouchcode on her behalf, on her own device. U can make a compelling case for this, since it may be convenient or make H look impolite if he refuses. U, however, if malicious, could have keystroke-logging software on her device that captures Has PIN.

Such attacks are even more of a concern when two parties are enrolled to vouch for one another. As discussed above, it is enough for a helper to know a user's PIN in order to impersonate her.

Of course, if H authenticates on U's device, or any other untrusted device, for any purpose, he exposes himself to the possibility that hidden malicious software will capture his tokencode and PIN in real time and impersonate him completely. This problem is not specific to vouching: an organization that allows any sharing of computers or other devices exposes itself to such vulnerabilities whether or not a vouching system is in place. It is possible, though, that the presence of a vouching system may encourage sharing of devices. Some countermeasures to asker-helper attacks are possible. For example, the vouching system can enforce a policy whereby an asker is removed from the helper's list of helpers until the helper changes his PIN.

The above-described vouching system was implemented utilizing an asker web application, a helper web application, and an administrative program. Both web applications consisted of sequences of Common Gateway Interface (CGI) applications developed in C++ and running on the Microsoft® Internet Information Services (IIS) web server. The administrative application was a Windows® application developed in C++ using the Microsoft Foundation Classes (MFC). The underlying database, common to all the applications, was built in Microsoft Access.

The asker application simulates a generic web application protected by RSA SecurID®. The subsequent pages walk the asker through the steps required to authenticate without possession of a token. These web pages are as follows:

Asker Page 1: The normal user login page for RSA SecurID®, with fields for user name, tokencode and PIN. The special, added feature for vouching is a button labeled "Forgot/lost my Token."

Asker Page 2: Instructions for asker to contact a helper, with a form to enter the helper's login name.

Asker Page 3: A form for entering the asker's PIN and the vouchcode supplied to the asker by the helper.

Asker Page 4: If the PIN and vouchcode are both determined to be correct, this page displays another form that allows the asker to enter and confirm a temporary password.

The system may enforce security restrictions on the form of the temporary password. For example, the system may require that temporary passwords have at least a specified minimum length, such as eight characters.

Asker Page 5: If the temporary password is confirmed, the asker is presented with another login page where the PIN and temporary password are used to log in.

Asker Page 6: If the PIN and temporary password are both verified successfully, the asker is presented with a page confirming successful authentication.

The helper application allows the helper to retrieve vouchcodes for askers. It consists of only two pages:

Helper Page 1: The helper is presented with a login form with fields for his user name, tokencode and PIN, along with the name of the asker being assisted.

Helper Page 2: If the helper is successfully verified, a vouchcode is generated for the specified asker. The vouchcode is displayed to the helper who is then responsible for conveying the vouchcode to the asker.

The administrative application controls overall system configuration and the vouching capabilities of individual users. The application uses two dialogs, a general "Voucher Management" dialog and an asker-specific "Helper Management" dialog. The Voucher Management dialog controls several system parameters, such as the length and validity periods of both vouchcodes and temporary passwords. The Helper Management dialog specifies rules for the set of permissible asker-helper relationships. In this implementation, these relationships are confined within groups that are predefined by an administrator database. In other implementations, this database might be imported from an external source, such as a human resources database, in order to take advantage of previously established groups. Also, in this particular implementation, a given user may be designated as permitted to help anyone in the same group, permitted to help selected askers in the same group, or prohibited from helping any askers.

A number of important issues were addressed in the design of the above-noted implementation. For example, should the asker web application provide the asker with a list of her helpers? The difficulty, of course, is that since the asker has not yet authenticated to the system, such a list would be accessible to anyone. Helper lists could open the system up to social engineering attacks, since an attacker could learn the list of helpers for an asker he wishes to impersonate. We could, of course, require an asker to enter her PIN in order to see her list of helpers. This approach, however, would expose the PIN to a new vector of guessing attack. Omitting helper lists entirely could prove problematic because it may not be reasonable to expect askers to remember all of their helpers, especially if vouching is used infrequently. In the example implementation, it was determined not to list helpers, but this should in general be a matter of policy.

Another question involves the seeding of suitable groups in the Helper Management dialog of the administrative application. In an organization of any size, having individual helpers authorized to vouch for all askers is problematic, since there may be many askers whom a given helper does not know. A logical alternative is to have supervisors act as helpers for their subordinates, but this may prove to be an unacceptable burden for the supervisors, and an embarrassment for their subordinates. A more appropriate arrangement is for groups to consist of organizational peers. This should work well in that we can generally assume the askers within a group are familiar with each other and willing to act as helpers. Some form of peer-level group structure exists in most organizations, and, indeed, most human resources databases, and need not be created just for the purpose of using vouchers.

Social engineering issues relating the illustrative embodiments will now be addressed in greater detail.

The security of a voucher system depends critically, of course, on how users interact within its framework. In addition to ordinary data-security considerations, as reflected in the above-described security model, the various potential vulnerabilities to social engineering should be considered. Simple refinements to a vouching system, some incorporated into the example implementation, can considerably strengthen the security of the system as a whole. In the following description we explore the threat of social engineering and related problems and identify possible countermeasures.

Tailgating: Politeness is often at odds with security. For example, the practice of "tailgating," in which employees allow people to follow them when they unlock doors, undermines the security of physical access-control systems in office buildings. A desire for politeness often causes employees to grant access even to strangers, rather than to challenge them. A naïvely deployed voucher system can be similarly vulnerable to tailgating. If Harry receives a telephone call from a colleague Alice asking for his help, Harry may well feel uncomfortable refusing, even if he doesn't know Alice well (or at all).

In contrast to a physical-access system, a voucher system can impose restrictions on asker-helper relationships and activity. In the example implementation, the administrator defines the relationships permissible in the vouching system, allowing vouching, for example, only between peers of well-defined corporate groups. The aim of such features is, of course, to ensure against situations in which Harry feels pressure to offer help to an inappropriate asker Alice.

There are a broad range of alternative mechanisms for constraining helper-asker relationships. The possibilities are particularly rich when an interface exists between a vouching system and other communication systems. For instance, a vouching system integrated with a telephone system might automatically enroll Alice as an asker for Harry if the two speak on the telephone on a regular basis. Such solutions require sensitivity to privacy concerns, of course. Additionally, Harry might only be permitted to vouch for Alice when she calls from a telephone number that Harry himself has recently called. For deployment of voucher systems in consumer environments, where administrative oversight and user awareness of security may be limited, such automated approaches could be particularly attractive. The automated approaches are particularly useful in environments utilizing VoIP and similar technologies to provide tighter integration of communication systems.

Weakly Authenticated Contact: Similar in spirit to the problem of tailgating is that of weakly authenticated contact. Suppose that Alice is registered as an asker for Harry, and Harry receives a request via e-mail from someone purporting to be Alice. Should he offer his help? Such e-mail could, of course, originate with an entirely unauthenticated source, e.g., a public e-mail account. Without proper safeguards, Harry could easily end up helping an impostor.

It is important that vouching policies prohibit poorly authenticated contact by an asker. For example, helping may be forbidden to askers who communicate by e-mail, unless, perhaps, the e-mail is internal to a company, followed up with a phone call, or otherwise appropriately authenticated. The safest policy is to mandate telephone or face-to-face contact, although such contact is not a requirement of the invention.

Policy enforcement mechanisms should be provided. Ideally, as suggested in the above discussion of tailgating, an integrated platform might automate policy enforcement. In systems with loose affiliation among modes of communication, such automation may be difficult to achieve. A more practical approach might be to require helpers to indicate how they have been contacted by askers, and to authorize or deny vouching transactions accordingly. For example, a pull-down menu may be provided in Helper Page 1 for this purpose, with the descriptions "E-mail," "Telephone," "In person," and "Other" specifying the form of asker contact. If the helper chooses "E-mail" or "Other," the system warns the helper that the mode of contact is prohibited by system policy and denies the vouching transaction.

We emphasize the importance of allowing the helper to specify the form of asker contact accurately, even if the form of contact violates system policy. Otherwise, the helper may be tempted simply to bypass the protective mechanism. For example, if a menu of contact options lists only the choices "Telephone" and "In person," users contacted by e-mail may be tempted just to select "Telephone" because of the lack of a more accurate option (in spite of any warnings). Delicate design decisions can have a big impact. Even the order of menu choices is important: the pull-down menu may give "E-mail" as a first choice, so that careless menu selection results in rejection of the helping request.

Another mechanism that can help prevent inappropriate use of vouching requests by e-mail is reduction or elimination of the helper's ability to cut and paste voucher codes. For example, a vouchcode might be displayed as an image, rather than text. Some people display their e-mail addresses on web pages this way to discourage bots from harvesting them.

Of course, a user who wishes to bypass the contact policy of the vouching system can do so. Our belief, however, is that most users will willingly comply with system policy provided that such compliance is not onerous. Of course, administrator-level system auditing can be a powerful additional mechanism for policy enforcement. The e-mail notices described above provide a type of peer-level audit mechanism that will also help curb abuses.

Spidering: Any systemic weakness in the second factor used alongside voucher codes (the PIN in the implementation described above) poses a special hazard. Given such weakness, an attacker that has compromised one helper can readily compromise other accounts. Consider, for example, an organization in which PINs are user-selected and many users choose the PIN '1234' for convenience. An attacker who has compromised Harry's account can simulate a voucher request from Alice, perhaps guess Alice's PIN, compromise Alice's account, proceed to attack Alice's enrolled askers, and so forth. An organization with a loose social network and thus high exposure to social engineering would be similarly at risk.

The helper-asker relationships in a voucher system may be represented very simply as a digraph D in which each user is represented by a node and each enrolled helper-asker relationship as a directed edge. A natural strategy for an attacker that has compromised one node is to exploit weak adjacent edges in order to compromise as much of the system as possible. We refer to such an attack, and its exploitation of the web of helper-asker relationships, as spidering.

We emphasize that traversal of any edge in D by an attacker requires compromise of the second factor in the vouching system (e.g., users' PINs). Thus the best defense against spidering is a sound vouching protocol combined with a good second factor. Other defensive mechanisms are possible, however. Among these are:

1. Dynamic digraphs: The digraph D might evolve as a function not just of user relationships, but also of recent voucher assignments. For example, if Alice has authenticated using a voucher assigned by Bob, Alice herself might lose her permission to assign a voucher to another employee for a certain period of time or until she re-authenticates in a stronger manner. Other throttling rules might also apply. For example, suppose that an edge in D is colored if vouching has taken place recently between the corresponding helper and asker. The vouching system might prohibit vouching or alert administrators if the diameter of a colored subgraph grows beyond some pre-specified threshold.

2. Multiple vouchers: To extend the digraph-based view of a voucher system, a user may be able to authenticate only as the result of a Joint operation among several connected users. For example, Alice might only be able to authenticate in a voucher system on receiving vouchers from two authorized helpers, rather than one.

Lazy Vouching: Of course, a voucher system should be easy to use. If we make it too easy, though, users may be tempted to rely on the voucher mechanism as a primary authenticator. We refer to such undue reliance on vouching as lazy vouching.

For example, Alice might decide never to bother obtaining an authentication token from system administrators, but instead rely on Harry whenever she needs to authenticate. In some environments, this may not be a problem. After all, lazy vouching does not introduce a new technical vector of attack. Lazy vouching can undermine system security in two ways, however: (1) In a voucher system with administrative audit, lazy vouching can make vouching seem unexceptional, and thereby obscure system breaches; (2) By desensitizing users to the process of vouching and the surrounding checks, lazy vouching can increase risks of social engineering.

For these reasons, we believe that vouching systems should be designed and configured to discourage lazy vouching. In practice, we believe that the light burden of having to fill out browser forms in the example implementation is a good deterrent.

The vouching system described in conjunction with the illustrative embodiments above is simple and secure, but numerous variants and extensions are possible, including those outlined below:

Alternate Factors: Vouching need not be restricted to authentication tokens and accompanying PINs. The vouching procedure could work with a different primary authentication factor. As an example, in the protocol described above for RSA SecurID®, a voucher system could permit swapping of the roles of the tokencode and PIN to deal with the case where an asker has forgotten her PIN but still has her token. In addition, the protocols can be implemented using protocols that do not involve a PIN. The disclosed techniques can also be adapted in a straightforward manner to numerous other authentication contexts, such as allowing a helper to attest to a particular attribute of an asker. For example, a helper might vouch that an asker is over the age of 21. In such an arrangement, a voucher code may be used in place of some other type of authentication credential, such as a driver's license.

Restricted privileges: To enhance the security of a vouching protocol and discourage lazy vouching, a voucher system might grant restricted privileges to askers. For example, the system might permit viewing of e-mail, but not sending, or might limit access to company-sensitive documents.

Asker Selection of Helpers: In some deployments the involvement of an administrator or supervisor in the enrollment process might be cumbersome. Accordingly, askers may be permitted to designate their own helpers. Additional security measures may be needed in such an embodiment.

It should again be emphasized that the above-described embodiments of the invention are presented for purposes of illustration. Many variations and other alternative embodiments may be used. For example, although described in the context of particular system and device configurations, the techniques are applicable to a wide variety of other types of authentication systems and associated devices. The particular process steps used to generate, communicate, authenticate and otherwise process a vouchcode may be varied in alternative embodiments. Moreover, as previously mentioned, the various model parameters and other simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A user authentication method comprising the steps of:
authenticating a first user;
generating a voucher code that is provided to the authenticated first user for delivery to a second user different than the first user;
receiving the voucher code from the second user; and
authenticating the second user based on the voucher code;
wherein the steps of authenticating the first user, generating the voucher code, receiving the voucher code, and authenticating the second user are performed by a processing device comprising a processor coupled to a memory.

2. The method of claim 1 further comprising the step of providing the authenticated second user with a temporary code based on the voucher code and utilizable for at least one additional authentication.

3. The method of claim 1 wherein the first user provides the voucher code to the second user responsive to a request by the second user for the first user to vouch for the second user to thereby allow the second user to be authenticated.

4. The method of claim 1 wherein the first user is equipped with an authentication token and the step of authenticating the first user comprises authenticating the first user utilizing a tokencode from the authentication token and a personal identification number as submitted by the first user.

5. The method of claim 1 wherein the second user is equipped with an authentication token that is not currently available for use in authentication.

6. The method of claim 5 wherein the step of authenticating the second user further comprises authenticating the second user utilizing the voucher code and a personal identification number as submitted by the second user.

7. The method of claim 1 wherein the second user is equipped with an authentication token that is currently available for use in authentication and the step of authenticating the second user comprises authenticating the second user utilizing the voucher code and a tokencode from the authentication token.

8. The method of claim 1 further including the step of requiring establishment of a helper-asker relationship between the first and second users prior to permitting the second user to be authenticated based on the voucher code.

9. The method of claim 8 further including the step of providing the first user with an opportunity to accept or deny the helper-asker relationship prior to storing information indicative of establishment of the helper-asker relationship.

10. The method of claim 8 further including the step of at least partially automating establishment of the helper-asker relationship utilizing existing relationship information available from a database.

11. The method of claim 1 wherein the step of authenticating the second user based on the voucher code further comprises the step of confirming that the voucher code is received within a limited time period designated for a corresponding vouching session initiated by the first user.

12. The method of claim 2 wherein the temporary code is valid for multiple subsequent authentications of the second user after expiration of the voucher code.

13. The method of claim 1 further comprising the step of notifying the first user of success or failure of authentication of the second user based on the voucher code.

14. The method of claim 1 further comprising the steps of:
authenticating at least one additional user; and
generating at least one additional voucher code that is provided to the authenticated at least one additional user;
wherein the step of receiving the voucher code from the second user further comprises receiving multiple voucher codes from the second user; and
wherein the step of authenticating the second user based on the voucher code further comprises authenticating the second user based on the multiple voucher codes.

15. A non-transitory processor-readable storage medium having embodied therein one or more software programs, wherein the one or more software programs when executed by a processor implement the steps of the method of claim 1.

16. An authentication server comprising:
at least one processing device, said at least one processing device comprising a processor coupled to a memory;
wherein the authentication server is configured to authenticate a first user, to generate a voucher code that is provided to the authenticated first user for delivery to a second user different than the first user, to receive the voucher code from the second user, and to authenticate the second user based on the voucher code.

17. The authentication server of claim 16 wherein said server is configured to provide the authenticated second user with a temporary code based on the voucher code and utilizable for at least one additional authentication.

18. The authentication server of claim 16 wherein the server is configured to authenticate the second user utilizing the voucher code and a personal identification number as submitted by the second user.

19. The authentication server of claim 16 wherein the server is configured to require establishment of a helper-asker relationship between the first and second users prior to permitting the second user to be authenticated based on the voucher code, and further wherein the server is configured to provide the first user with an opportunity to accept or deny the helper-asker relationship prior to storing information indicative of establishment of the helper-asker relationship.

20. An authentication system comprising:
a first processing device associated with a first user;
a second processing device associated with a second user different than the first user; and
an authentication server configured for communication with the first and second processing devices over a network;
wherein the authentication server communicates with the first and second processing devices to authenticate the first user, to generate a voucher code that is provided to the authenticated first user for delivery to the second user, to receive the voucher code from the second user, and to authenticate the second user based on the voucher code.

* * * * *